US005537728A

United States Patent [19]

Van Mourik

[11] Patent Number: 5,537,728

[45] Date of Patent: Jul. 23, 1996

[54] MAGNETIC DADO SHIM

[75] Inventor: Johannes Van Mourik, Glen Allen, Calif.

[73] Assignee: Tom Decker, Glen Ellen, Calif.

[21] Appl. No.: 409,858

[22] Filed: Mar. 23, 1995

[51] Int. Cl.$^{6}$ .............................. B23Q 3/00; B26D 1/12; B27G 13/00

[52] U.S. Cl. ................................ 29/467; 29/464; 83/664; 144/218; 144/237; 144/238; 144/329

[58] Field of Search .................................... 144/218, 237, 144/238, 329; 29/464, 469, 26 A, 467; 83/664

[56] References Cited

U.S. PATENT DOCUMENTS

| | | | |
|---|---|---|---|
| 4,195,542 | 4/1980 | Zimmer | 83/664 |
| 4,589,458 | 5/1986 | McCord, Jr. | 144/238 |
| 5,309,962 | 5/1994 | McCord, Jr. et al. | 144/237 |
| 5,316,061 | 5/1994 | Lee | 144/218 |
| 5,368,079 | 11/1994 | Benway | 144/237 |

*Primary Examiner*—W. Donald Bray
*Attorney, Agent, or Firm*—Benman Collins & Sawyer

[57] ABSTRACT

A magnetic dado shim is a disc cut from highly flexible magnetic sheeting, and includes a central arbor hole. When the magnetic dado shim is placed concentrically on a steel dado blade, it sticks securely thereto, and will not easily shim in position. Therefore, the magnetic dado shim will not fall into the thread of an arbor and become damaged when the dado set is tightened thereon. Accordingly, the magnetic dado shim is very easy to install.

28 Claims, 1 Drawing Sheet

MAGNETIC DADO SHIM

BACKGROUND OF THE INVENTION

1. Field of the Invention

This invention relates generally to dado blades used with power saws, specifically to a magnetic dado shim for spacing apart dado blades.

2. Prior Art

A dado is a groove on a board for receiving the edge of another board, such as for joining perpendicular pieces of a cabinet, drawer, etc. A dado is cut with a set of dado blades, which typically includes a pair of circular blades spaced apart by one or more two-tooth blades, or four-tooth blades. Typical dado blades have standard ⅝" or 1–⅛" arbor holes for mounting on the drive sham or arbor of a power saw, and are tightened thereon by a nut and a washer. The blades are of a standard thickness, so that a suitable number of blades can be stacked together for cutting a dado for receiving a board of another standard thickness. E.g., two ⅛" thick circular blades can be spaced by two ⅛" thick two-tooth blades to make a ½" dado set for cutting a ½" dado for a ½" thick board.

Although boards are available in standard thicknesses, the actual thickness of any particular board can vary somewhat from its intended size due to poor manufacturing, shrinkage, expansion, etc. Therefore a dado cut to a standard width would often be slightly too narrow or too wide for snugly receiving a board.

Various adjustable dado sets have been proposed for providing an adjustable cutting width. U.S. Pat. No. 5,368,079 to Benway (1994) shows a dado set with a special blade having a non-standard, threaded hole for receiving a threaded collar. Turning the collar adjusts the spacing of the special blade from other blades. U.S. Pat. Nos. 4,589,458 to McCord, Jr. (1986) and 5,309,962 to McCord, Jr. et al. (1994) each shows an adjustable dado set with special blades having non-standard holes for receiving a pair of opposite cams. Turning the cams adjusts the spacing between the blades. However, the Benway and McCord devices both require special blades specifically designed for fitting their adjusting mechanisms, so that they cannot use conventional blades. Therefore, obtaining replacement blades for these devices is relatively difficult and expensive.

U.S. Pat. No. 5,316,061 to Lee (1994) shows plastic dado shims for positioning between and spacing apart dado blades. The shims are circular, and have an arbor hole and a radial slot for being installed on an arbor without removing the blades. The shims are provided in various thicknesses, so that one or a combination of several different shims can be used for minutely adjusting the spacing of a set of blades. Other dado shims commonly known in the carpentry trade are simple discs each with an arbor hole sized for closely fitting on an arbor, and are made of either paper or metal.

Unfortunately prior art dado shims are very difficult to install, because they frequently fall into and get caught in the relatively coarse thread of the arbor, i.e., they become eccentrically positioned on the arbor. As a result, the edges of their holes are cut or otherwise damaged when the blades are tightened together. Further, the crumpled shims cause the blades to be improperly spaced. When the shims fall into the arbor's thread, they hinder the installation as well as the removal of the blades. This problem is compounded several folds when several shims are used, because a properly placed shim would easily fall into the thread when the user is busy installing additional shims or blades. Therefore, ensuring the proper installation of most any prior art dado shim is a very frustrating and time consuming exercise. Furthermore, prior art paper and metal dado shims can easily become bent or otherwise damaged in harsh shop environments. Once damaged, they usually cannot be adequately flattened or repaired.

Still another problem is that blades stacked with nothing therebetween, or with metal shims therebetween, are prone to metal-to-metal vibration. This causes a chattering or whistling noise, which can become very annoying when the saw is used for prolonged periods of time. Also, when a user tries to measure the total width of a set of dado blades mounted on an arbor, but before they are tightened, the blades will tend to fall to one side of the arbor's coarse thread, so that they will not sit straight or parallel to each other. Therefore, accurate measurement of the set cannot be easily made.

OBJECTS OF THE INVENTION

Accordingly a primary object of the present invention is to provide a magnetic dado shim which stays securely in position once placed against a blade, so that it will not fall into and get caught in the thread of an arbor.

Another object of the present invention is to provide a magnetic dado shim which greatly facilitates the installation and removal of dado blades.

Still another object of the present invention is to provide a magnetic dado shim which can minutely adjust the cutting width of a set of dado blades.

Still another object of the present invention is to provide a magnetic dado shim which prevents dado blades from chattering or whistling.

Yet another object of the present invention is to provide a magnetic dado shim which holds adjacent blades together and in parallel, so that their cutting width can be accurately measured before they are tightened on an arbor.

Yet another object of the present invention is to provide a magnetic dado shim which can also hold paper, plastic, or metal shims flat against a blade.

Further objects of the present invention are to provide a magnetic dado shim which fits all conventional saws, which is durable, and which is very economical to manufacture.

SUMMARY OF THE INVENTION

A magnetic dado shim is preferably a disc cut from flexible magnetic sheeting. A central arbor hole on the shim suitably allows it to be installed on the arbor of a power saw. With the present invention, the magnetic dado shim sticks firmly against any steel saw blade, so that it will not fall into the thread of the arbor to hinder installation or removal of the dado set. Further the magnetic dado shim of the present invention dampens vibration between adjacent blades to prevent chattering or whistling. In addition, the magnetic dado shim of the present invention is also suitable for holding other shims that are made of paper, plastic, or metal flat against a blade.

DRAWING REFERENCE NUMERALS

10. Magnetic Dado Shim
11. Circular Magnetic Disc
12. Arbor Hole
13. Circular Dado Blades
14. Two-Tooth Dado Blades
15. Arbor
16. Thread
17. Washer
18. Nut

DETAILED DESCRIPTION—FIG. 1

Figure 1:
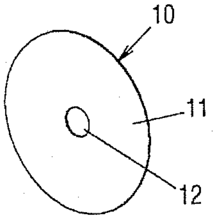
FIG. 1 is a side perspective view of a magnetic dado shim in accordance with a preferred embodiment of the invention.
Figure 2:
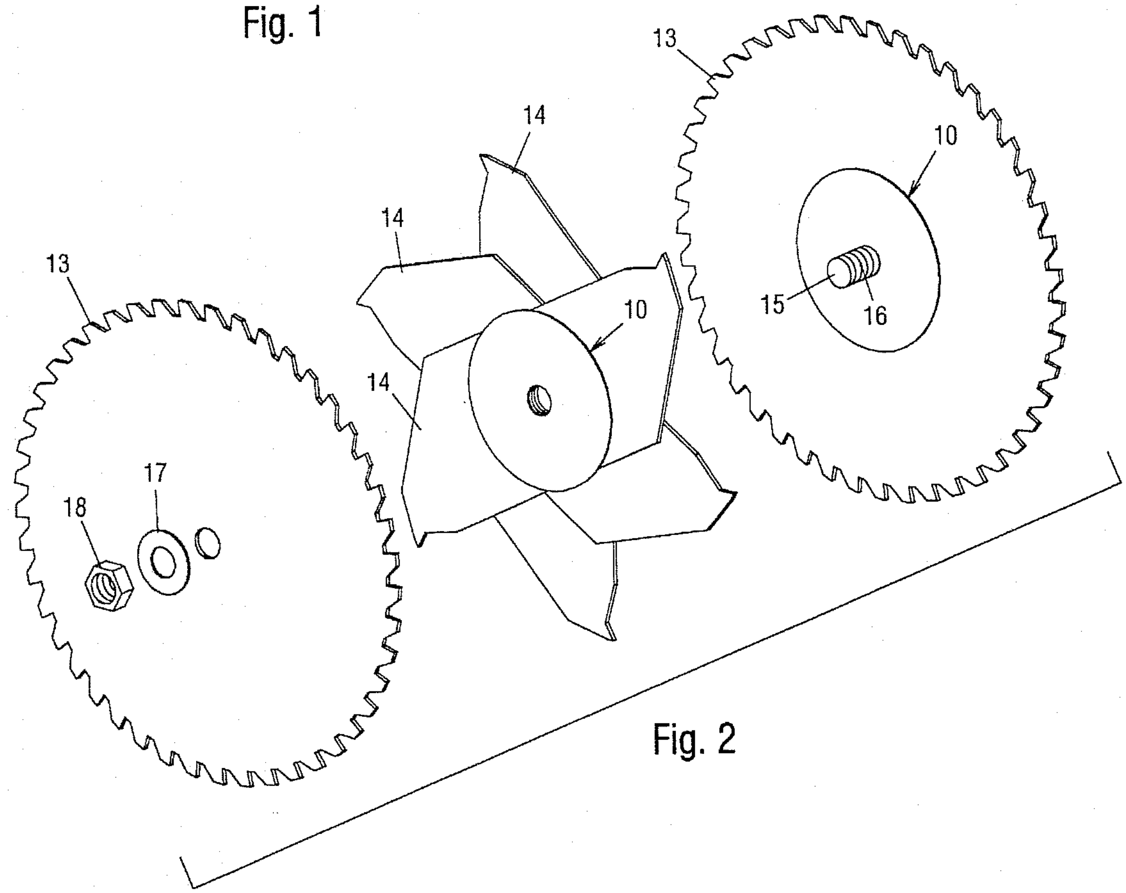
FIG. 2 is an exploded side perspective view of a dado set with magnetic dado shims in accordance with one embodiment of the present invention.

In accordance with a preferred embodiment of the present invention shown in the side perspective view in FIG. 1, a magnetic dado shim 10 is a circular magnetic sheet or disc 11 with a central arbor hole 12. By way of example, magnetic dado shim 10 is 4" in diameter, but of course shim 10 depending upon the needs of the system, as is well understood by those skilled in the art can be of any other diameter. Arbor hole 12 is preferably of an industry-standard size, such as ⅝" or 1–¼", for closely fitting on standard arbors (not shown), or hole 12 can be of any other suitable size for fitting other types of saws as is well understood by those skilled in the art. Magnetic dado shim 10 is economically manufactured by being die-cut from commonly available, inexpensive and highly flexible magnetic sheeting (not shown), which are available in a variety of thicknesses, including but not limited to in the range of 0.0007" to 0.05" and more particularly 0.020", 0.012", 0.010", and 0.008", for making shims of different thicknesses.

DETAILED DESCRIPTION FIG. 2

When positioning the magnetic dado shims 10, preferably magnetic dado shims 10 are first positioned concentrically on a conventional, steel circular dado blade 13 and on a conventional, steel two-tooth dado blade 14 before the blades are fitted onto an arbor 15 of a power saw (not shown). With the magnetic dado shims 10 thus positioned on the blades, the magnetic dado shims to stick firmly thereto by magnetic attraction, and thus will not easily shift in position. Therefore, when dado blades 13 and 14 are being installed on arbor 15, magnetic dado shims 10 will not fall into and get caught in the thread 16 thereof. Further, any number as well as any desired thicknesses of magnetic dado shims 10 may be chosen and are suitably stacked together, or alternating between blades, for finely adjusting the total cutting width of dado blades 13 and 14.

With magnetic dado shims 10 holding adjacent blades 13 and 14 firmly together in parallel by magnetic attraction before they are tightened, the total cutting width of the blades can be accurately measured and adjusted with additional or fewer shims 10, without having to repeatedly install and remove washer 17 and nut 18. Furthermore, if a paper, plastic, or metal shim (not shown) is placed between magnetic dado shim 10 and a blade, shim 10 will hold the non-magnetic shim securely in place by attracting both toward the blade. Of course, when the total cutting width of blades 13 and 14 is properly set, blades 13 and 14 are tightened on arbor 15 with washer 17 and nut 18.

When dado blades 13 and 14 are being removed from arbor 15, magnetic dado shims 10 will remain attached to their respective blades for convenient removal. As a result, magnetic dado shims 10 provide much quicker and easier installation and removal than prior art dado shims. Unlike prior art paper and metal dado shims, which are easily damaged, magnetic dado shims 10 are highly flexible, so that they can withstand a great deal of abuse without suffering any damage. Also, flexible magnetic dado shims 10 will dampen vibration between adjacent blades 13 and 14, so that they will prevent annoying chattering or whistling.

Accordingly the present invention provides a magnetic dado shim which will firmly stick to conventional steel dado blades, so that the shims will not fall into and become caught in the thread of an arbor. Magnetic shims are much quicker and easier to install than prior art dado shims. Which, heretofore, have not been magnetic. Further, magnetic shims in accordance with the present invention, dampen vibration between adjacent blades to prevent chattering or whistling the magnetic shims also hold adjacent blades firmly together, before tightened so that the cutting width can be conveniently measured and adjusted without having to repeatedly install and remove the nut. Magnetic shims of the present invention are further, suitably used to securely hold non-magnetic shims against a blade. The magnetic shims are also easily and economically made in a variety of different diameters, with different arbor hole sizes for fitting different saws, and in a variety of thicknesses for finely adjusting the spacing of dado blades. In addition, the magnetic shims are also very durable.

Although the above descriptions are specific, they should not be considered as limitations on the scope of the invention, but only as examples of the preferred embodiment. Many other ramifications and variations are possible within the teachings of the invention. For example, the magnetic dado shims can be made in other shapes, such as square, triangular, octagonal, etc., and in other diameters and thicknesses. Therefore, the scope of the invention should not be determined by the examples given, but by the appended claims and their legal equivalents.

I claim:

1. A dado assembly comprising:

a plurality of dado blades; and a magnetic sheet means for securely attaching between the plurality of dado blades by magnetic attraction, so as to prevent shifting.

2. The dado shim of claim 1 wherein said magnetic sheet is highly flexible for resisting damage.

3. The dado shim of claim 1 wherein said magnetic sheet has a thickness of 0.020 inch.

4. The dado shim of claim 1 wherein said magnetic sheet has a thickness of 0.012 inch.

5. The dado assembly of claim 1 wherein said magnetic sheet has a thickness of 0.010 inch.

6. The dado assembly of claim 1 wherein said magnetic sheet has a thickness of 0.008 inch.

7. The dado assembly of claim 1 wherein said magnetic sheet has a thickness in the range of 0.0007–0.05 inches.

8. A dado assembly comprising:

a plurality of dado blades; and a magnetic sheet means including an arbor hole adapted to be concentrically mounted on an arbor, the magnetic sheet means for securely attaching between the plurality of dado blades by magnetic attraction so as to prevent shifting.

9. The dado assembly of claim 8 wherein said magnetic sheet is flexible for resisting damage,

10. The dado assembly of claim 8 wherein said magnetic sheet has a thickness of 0.020 inch.

11. The dado assembly of claim 8 wherein said magnetic sheet has a thickness of 0.012 inch.

12. The dado assembly of claim 8 wherein said magnetic sheet has a thickness of 0.010 inch.

13. The dado assembly of claim 8 wherein said magnetic sheet has a thickness of 0.008 inch.

14. The dado assembly of claim 8 wherein said arbor hole has a diameter of ⅝ inch.

15. The dado assembly of claim 8 wherein said arbor hole has a diameter of 1–⅛ inch.

16. The dado assembly of claim 8 wherein said magnetic sheet has a thickness in the range of 0.0007–0.05 inches.

17. The dado assembly of claim 8 wherein said magnetic disc has a thickness in the range of 0.0007–0.05 inches.

18. A dado assembly comprising:

a plurality of dado blades; and a magnetic disk means of a predetermined shape having a central arbor hole adapted to be concentrically mounted on an arbor, the magnetic disk means for securely attaching between the plurality of dado blades by magnetic attraction so as to prevent shifting.

19. The dado assembly of claim 18 wherein said magnetic disc is flexible for resisting damage.

20. The dado assembly of claim 18 wherein said magnetic disc has a thickness of 0.020 inch.

21. The dado assembly of claim 18 wherein said magnetic disc has a thickness of 0.012 inch.

22. The dado assembly of claim 18 wherein said magnetic disc has a thickness of 0.010 inch.

23. The dado assembly of claim 18 wherein said magnetic disc has a thickness of 0.008 inch.

24. The dado assembly of claim 18 wherein the predetermined shape is circular.

25. The dado assembly of claim 18 wherein the predetermined shape is triangular.

26. The dado assembly of claim 18 wherein the predetermined shape is square.

27. The dado assembly of claim 18 wherein the predetermined shape is octagonal.

28. A method for providing a dado assembly, the method comprising:

providing at least one magnetic sheet means of a predetermined shape; and positioning the at least one magnetic sheet means adjacent to the at least two dado blades through magnetic attraction so as to provide the dado assembly, the magnetic sheet means for securely attaching between the at lease two dado blades to prevent shifting.

* * * * *